J. W. FLOWER.
PIPE CONNECTION.
APPLICATION FILED JAN. 18, 1918.

1,278,128.

Patented Sept. 10, 1918.

WITNESS
C. E. Braman

INVENTOR.
John W. Flower
BY
Pagelsen and Spencer
ATTORNEYS

UNITED STATES PATENT OFFICE.

JOHN W. FLOWER, OF DETROIT, MICHIGAN.

PIPE CONNECTION.

1,278,128.  Specification of Letters Patent.  Patented Sept. 10, 1918.

Application filed January 18, 1918. Serial No. 212,422.

*To all whom it may concern:*

Be it known that I, JOHN W. FLOWER, a citizen of the United States, and residing at Detroit, in the county of Wayne and State of Michigan, have invented a new and Improved Pipe Connection, of which the following is a specification.

This invention relates to means for connecting conduits for gas and water and particularly for connecting branch lines to mains already in position without disturbing the mains, and its object is to provide a connection between pipes or conduits of this character which can be installed in a minimum of time, which will have great rigidity, and which will not leak.

This invention consists in a saddle fitting the main conduit and receiving the branch conduit and formed with a groove in the face bearing on the main conduit, a novel packing ring in the groove, a yoke extending around the main conduit and engaging it diametrically opposite the saddle but spaced from the main conduit adjacent the saddle so as to permit the packing ring being properly calked, and rigid connections between the yoke and saddle. It further consists in the details of construction illustrated in the accompanying drawing and particularly pointed out in the claims.

Figure 1:
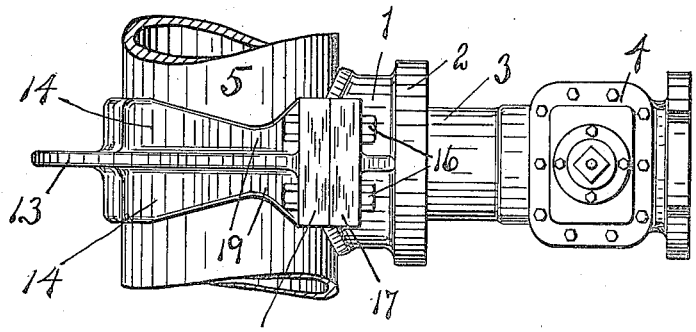
Figure 2:
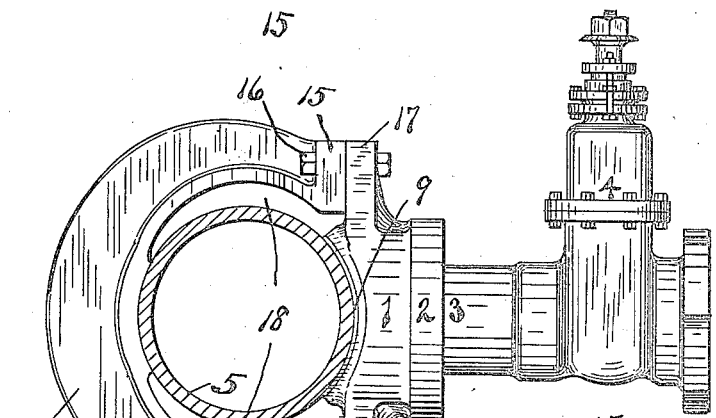
Figure 3:
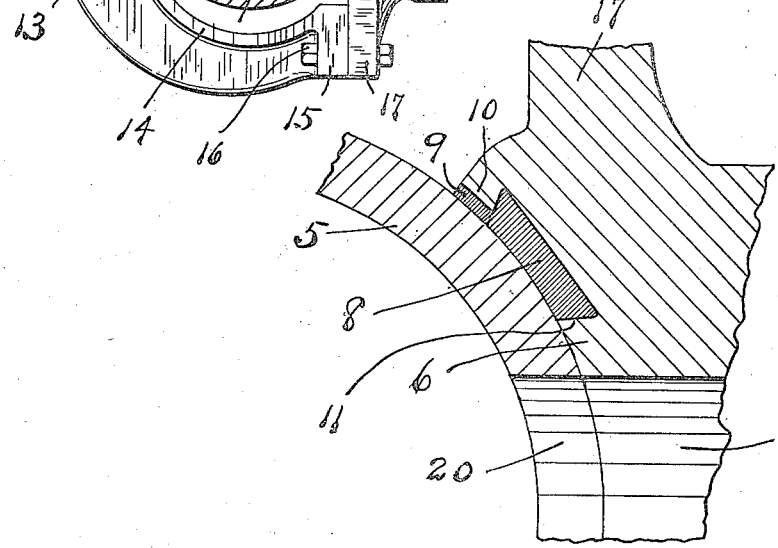

In the accompanying drawing, Figure 1 is a plan of this improved pipe connection uniting a horizontal branch pipe to a horizontal main conduit. Fig. 2 is a side elevation of this connection. Fig. 3 is a section through the engaging surfaces of the main conduit and this improved connection.

Similar reference characters refer to like parts throughout the several views.

This improved pipe connection consists of a saddle, a yoke, a packing ring and bolts to cause the saddle and yoke to rigidly engage a main conduit. Any desired form of connection between the saddle and the branch conduit may be employed. In the drawing the saddle 1 is shown formed with a hub 2 to receive a spigot end 3 on a gate valve 4.

The saddle is formed generally to fit cylindrical conduits 5 of a predetermined size along an inner bearing face 6, as shown in Fig. 3, next to the bore 7 of the saddle. Just outside of this bearing face 6 is a dove-tail groove to receive a packing ring 8 of soft metal, preferably lead, formed with a flange 9 that extends beneath the outer edge 10 of the saddle. This flange is designed to receive the blows of the calking tool and the impact of such blows will cause the packing ring to swell to fully fill the space between the saddle and the conduit 5. The packing material is prevented from wedging in between the face 6 and the conduit 5 by reason of the wall 11 of the groove being inclined to the face 6. There is therefore no tendency to tip the saddle after it has been secured in place and after the calking has been partially completed.

The yoke is formed to extend more than half way around the conduit and comprises the web 13, flanges 14 and lugs 15 through which the bolts 16 extend to secure the yoke to the lugs 17 on the saddle. The flanges 14 engage the conduit 5 for a sufficient distance diametrically opposite the saddle to prevent any rocking movement between them. These flanges are then spaced apart from the conduit 5 at 18 in order to permit the entire edge of the flange 9 of the packing ring to be reached by proper calking tools. For this reason, the width of these flanges may be reduced at 19 as shown in Fig. 1.

The packing ring will preferably be cast in place before the saddle is placed on the conduit 5 before the hole 20 has been cut therein. The yoke is then positioned and secured to the saddle which causes both to grip the conduit 5. The flange 9 of the packing ring is then calked to prevent leakage. It will be noticed that no metal need be melted for packing at the place where the connection is to be made and that the excavation below the main conduit need be no deeper than just sufficient to permit the yoke to be passed under it.

The details and proportions of the various parts of this connection may all be changed by those skilled in the art without departing from the spirit of my invention disclosed in the following claims.

I claim:—

1. In a pipe connection, the combination of a main conduit, a tubular saddle having one face engaging the main conduit and formed with a dove-tail groove, said face within the groove substantially fitting the main conduit and without the groove being spaced apart from said main conduit, a packing ring within said groove in contact with the main conduit and having a flange extending laterally between said saddle and said main conduit, a rigid yoke extending around said main conduit and means to connect the ends of the yoke to said saddle.

2. In a pipe connection, the combination of a main conduit, a tubular saddle having one face engaging the main conduit and formed with a dove-tail groove, said face within the groove substantially fitting the main conduit and without the groove being spaced apart from said main conduit, a packing ring within said groove in contact with the main conduit and having a flange extending laterally between said saddle and said main conduit, a rigid yoke extending around said main conduit and engaging it diametrically opposite the saddle but being spaced therefrom at each side of the saddle to permit access to the outwardly extending flange on the packing ring, and bolts to rigidly secure the ends of said yoke to said saddle.

3. In a pipe connection, the combination of a main conduit, a tubular saddle having one face engaging the main conduit and formed with a dove-tail groove, said face within the groove substantially fitting the main conduit and without the groove being spaced apart from said main conduit, a packing ring within said groove in contact with the main conduit and having a flange extending laterally between said saddle and said main conduit, a rigid yoke extending around said main conduit and means to connect the ends of the yoke to said saddle, the length of said yoke longitudinally of the main conduit being reduced adjacent the saddle to facilitate calking the packing ring between the main conduit and the saddle.

JOHN W. FLOWER.